Oct. 14, 1958  M. TELKES  2,856,506
METHOD FOR STORING AND RELEASING HEAT
Original Filed April 22, 1952  3 Sheets-Sheet 1

INVENTOR.
Maria Telkes
BY Kenyon & Kenyon
ATTORNEYS

Oct. 14, 1958
M. TELKES
2,856,506
METHOD FOR STORING AND RELEASING HEAT
Original Filed April 22, 1952
3 Sheets-Sheet 2
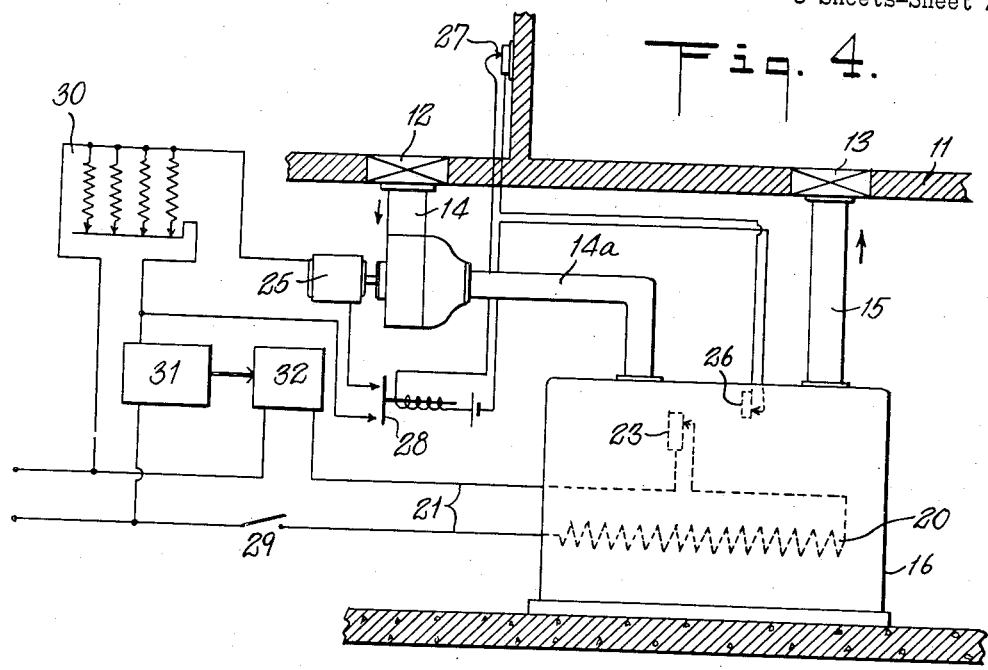
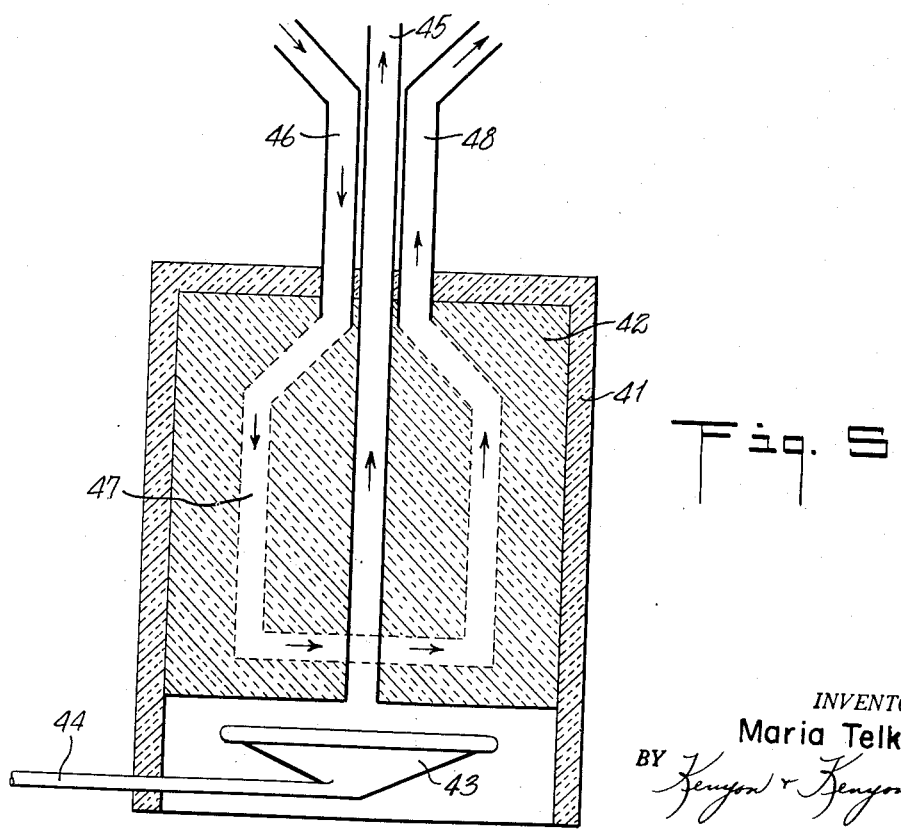
INVENTOR.
Maria Telkes
BY Kenyon & Kenyon
ATTORNEYS Oct. 14, 1958　　　　　M. TELKES　　　　　2,856,506
METHOD FOR STORING AND RELEASING HEAT
Original Filed April 22, 1952　　　　　　　　3 Sheets-Sheet 3

INVENTOR.
Maria Telkes
BY Kenyon & Kenyon
ATTORNEYS

United States Patent Office 2,856,506
Patented Oct. 14, 1958

2,856,506
METHOD FOR STORING AND RELEASING HEAT

Maria Telkes, Cambridge, Mass.

Original application April 22, 1952, Serial No. 283,667, now Patent No. 2,808,494, dated October 1, 1957. Divided and this application December 3, 1956, Serial No. 627,970

7 Claims. (Cl. 219—39)

This invention relates generally to a method of storing and releasing heat utilizing a heat storage material and to a method of heating a substance which includes transferring stored heat thereto from such a material. The method of this invention is herein disclosed for purposes of illustration but not limitation as used in connection with heating furnaces, and more specifically space heaters in which heat may be stored at certain periods for subsequent release. Such heat storing furnaces are desirable in situations where peak heating loads are encountered of such relatively short duration that it is uneconomical to design furnaces with a heat input large enough to take care of the peak loads, as well as in situations where the fuel or energy cost for supplying the heat is subject to reduced "off peak" rates. By the present invention means are provided which can be utilized either to store excess heat for peak load consumption, thereby making possible uniform or steady operation of the primary source of heat, or to use the primary heat source intermittently taking advantage of "off peak" rates and consuming the stored heat during other periods. Other objects and advantages of this invention will be made clear in the following specification and claims.

Heat storage of itself is not new. It has been suggested that gravel, rocks, concrete, soapstone, and even blocks of steel and the like be heated to a high temperature and that the heat content of the material be thereafter used while the temperature of the heat absorbing means goes down. Such devices of the prior art, however, are limited in their applicability by the fact that the only heat stored is sensible heat, which is a function of the specific heat of the material used. Since the specific heat of available materials is low, usually in the neighborhood of 0.2 B. t. u. per pound, the heat storage capacity of such material between, for example, 200° and 500° F. is only 60 B. t. u. per pound. This renders such heat storing means impractical for space heating purposes because of the large bulk necessary to provide storage for large amounts of heat. More practical heat storage systems have been devised in which heat of solution or heat of fusion, or a combination of both, are utilized. In such systems, a crystalline material having a large amount of water of crystallization may be used, the material being so applied and selected that, upon being heated, the solid material melts or dissolves in its own water of crystallization, with the resulting storage of relatively large quantities of heat in the form of latent heat of fusion and solution. The heat so stored can be recovered by permitting the material to recrystallize. Such systems are effective at relatively low temperatures, and are best utilized either where a relatively low temperature is desired, as in the so-called chemical hot water bottles, or where large heating surface is available.

It is the purpose of the present invention to provide a system, including apparatus and method, for storing heat at a relatively high temperature, in the range of 300 to 550° F., for example, and yet to provide a heat storage capacity several times that available by the first mentioned systems. This I accomplish by utilizing as heat storage medium a crystalline solid which is dimorphic, that is to say, which changes from one crystalline form to another on the application of heat, which has a transition temperature between 300 and 550° F., and which has a relatively high heat of transition. I have found that anhydrous sodium sulfate, either by itself or modified by the addition of other salts as more fully described below, can be converted by heating from the rhombic crystal form to a hexagonal form, and that this change requires about 128 B. t. u. per pound. This heat of transformation, or heat of transition, is released when the crystals are cooled and changed from the hexagonal back to the rhombic form. Since the change occurs below 500° F., the heat stored between 200° and 500° F. by anhydrous sodium sulfate is in excess of 180 B. t. u. per pound, as compared with a heat storage of 60 B. t. u. per pound by sensible heat alone.

The transition temperature of sodium sulfate, when used alone, is 451° F. There are applications in which it is preferable to store and release the major part of the heat at a somewhat lower temperature, and I have found that this can be effected by admixing with the anhydrous sodium sulfate small amounts of other anhydrous salts, such as lithium sulfate, potassium sulfate and calcium sulfate. The addition of small amounts, up to about 5%, of any of these other salts, or mixtures thereof, depresses the transition temperature of the sodium sulfate. Thus, I have found that 5% of lithium sulfate reduces the transition temperature of 414° F., 5% of potassium sulfate reduces it to 370° F. and 4% of calcium sulfate reduces it to 350° F.

As will be readily understood from the above, my present invention provides a system, comprising method and apparatus, for utilizing the heat of transition of a dimorphic substance, such as sodium sulfate, alone or admixed with small quantities of other salts, as a heat storing and releasing device. Some preferred forms of my system are shown in the accompanying drawings in which:

Fig. 4 shows how my system can be connected to utilize available electrical energy after other energy loads are taken care of;

Fig. 5 shows another form in which my system can be applied for utilizing gas or oil fuel instead of electrical energy as the heating medium;

It will be recognized that Figs. 1 to 6, inclusive, are largely diagrammatic and that the apparatus shown therein may be varied without departing from the scope of my invention, and also that other modifications of the apparatus, including those hereinafter discussed, will readily suggest themselves upon the disclosure of my invention herein contained.

Figure 1:
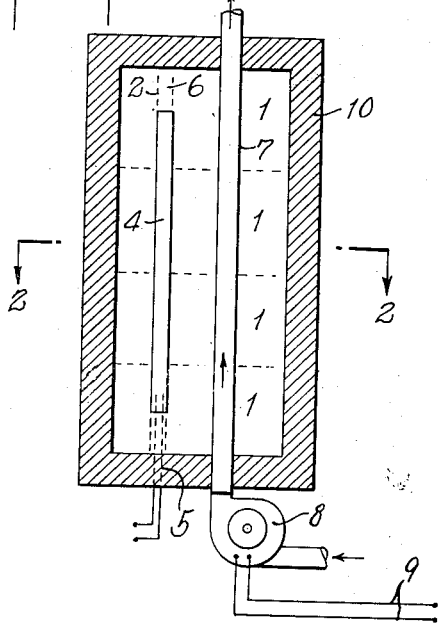
Fig. 1 is a sectional view of a simple form of apparatus embodying my invention comprising a series of blocks of my material associated with heating and heat transfer means.
Figure 2:
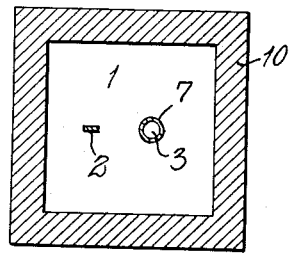
Fig. 2 is a section along the line 2—2 in Fig. 1.

In Figs. 1 and 2 the numerals 1 designate blocks of anhydrous sodium sulfate, with or without the modifiers referred to above. These blocks are preferably prepared by mixing the powdered sulfate with 5 to 10% of water and pressing the resulting mixture into the form desired, When dried the resulting blocks are heated to slightly above 500° F. and cooled. They can be handled easily and do not readily chip or break. The blocks can also be obtained by fusing the sodium sulfate (with or without the additives) and casting it in molds. However, the high melting point of the sodium sulfate and the brittleness of the cast product makes this method of producing the blocks less desirable. While the blocks prepared by my preferred method are non-dusting, I can, as a precautionary measure, coat them with a thin coat of so-called high-temperature paint, such as a silicone base material. Where it is expected that rapid heat input or release will be required, I prefer to embody in the blocks a small amount of relatively highly heat conductive material, such as metal foil, wire or ribbon, steel wool, and the like. The incorporation of up to 5% of steel wire, ribbon or wool increases the heat conductivity (and hence the rate of heat transfer) many fold. In the form of the device shown in Figs. 1 and 2 cores are inserted into the mass being pressed which, on removal, provide slots 2 and channels 3. The blocks are then arranged one above the other, with the slots and channels in registry, as shown in Fig. 1. Into the slots 2 is inserted an electric strip heater 4 with leads 5 connected to a source of electric energy not shown. After the insertion of the strip heater, the slots above and below the heater are preferably filled with sodium sulfate either in the form of powder or plugs 6. Through the channels 3 is inserted a pipe 7 which is connected with a fan or blower 8 for forcing air or other gaseous heat transfer medium through the pipe. If desired, water instead of air can be circulated through pipe 7, or the pipe can be omitted and the blower connected so as to force the gaseous medium directly through the channels 3. Blower 8 is actuated by an electric motor supplied with energy from the leads 9. The blocks of sodium sulfate are enclosed in a heat insulating shell 10.

In operating the device in Figs. 1 and 2, the sodium sulfate blocks are heated by means of the strip heater to a temperature above their transition point. The heater is preferably controlled by a thermostat (not shown) embedded in one of the blocks and so adjusted as to turn off the current to the strip heater at any desired point above the transition temperature. Thereafter the heat is stored in the sodium sulfate blocks, its dissipation being prevented by the insulating shell 10. When it is desired to utilize the stored heat, air or water is passed through pipe 7, or air or other gas through channels 3. The blower may be switched on manually or may be controlled by a second thermostat (not shown) which may be installed either in the space to be heated or in pipe 7 just after it leaves the furnace. When the device shown in Figs. 1 and 2 is used in this way, assuming for example a sulfate mixture with a transition point of 375° F. and adequate heat transfer to fluid passing through pipe 7 at temperatures of the sulfate mass above 200° F., approximately 178 B. t. tu. per pound of sulfate may be stored by raising its temperature from 200° F. to 450° F. When this heat is released by heat transfer to fluid flowing through pipe 7 or channels 3, 15 B. t. u. per pound wil be available at temperatures of 450 to 375° F. and 35 B. t. u. at temperatures of 375 to 200° F., the aggregate of 50 B. t. u. per pound being that represented by the sensible heat of the sulfate, while the larger proportion of the stored heat, or approximately 128 B. t. u. per pound, is released at the constant temperature of 375° F. The advantage of a substantially constant temperature source of stored heat is obvious, and it is possible to operate my device, whether as shown in Figs. 1 and 2 or in any other form, at substantially constant temperatures relying only on the heat of transition as the means of storing and releasing heat. However, it is usually more convenient to use some of the sensible heat capacity of the sulfate as well, and I ordinarily prefer to operate the systems of my invention between temperatures 75–100° F. below and 50–75° F. above the transition temperature of the heat storage material employed. When the system is connected in such a way as to utilize "off peak" electricity as the source of heat, I prefer that it be adjusted so that the heat releasing part of the cycle may continue to be operated until the heat storage material reaches even lower temperatures, such as for example 200° F.

Figure 3:
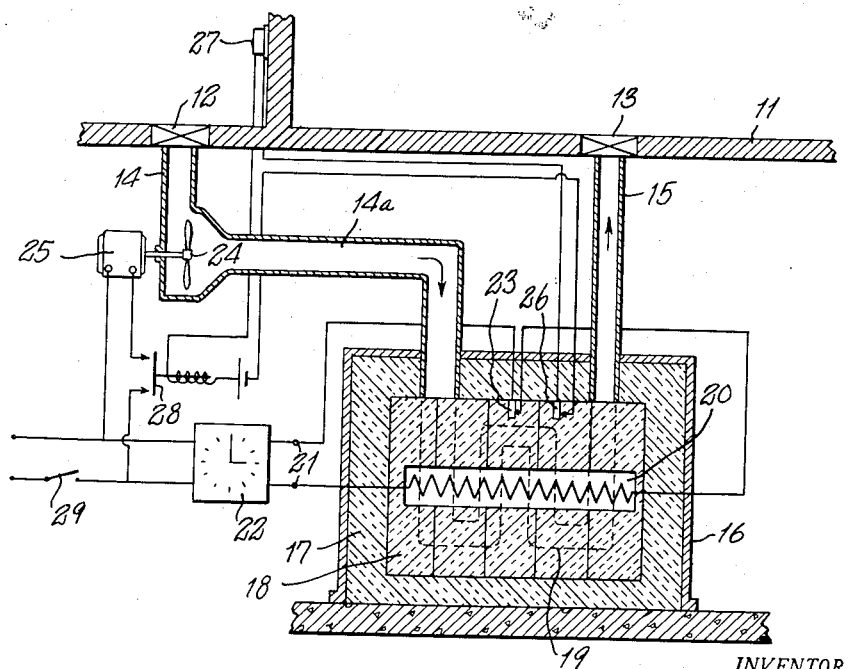
Fig. 3 shows how my system can be incorporated in a space heating unit for utilizing off-peak electrical energy as the source of heat.

Fig. 3 shows one method of installing my system for space heating. When so installed, my system may be used as the only heater or may be used in conjunction with other heaters. Numeral 11 designates the floor of the space to be heated, which is equipped with louvers 12 and 13 opening from the space to be heated into ducts 14 and 15 respectively. My heat storing furnace includes a shell 16, a layer of heating insulating material 17, and a mass of my dimorphic heat storing and releasing material 18. The latter is preferably sodium sulfate or sodium sulfate admixed with up to 5% of lithium sulfate, potassium sulfate, calcium sulfate or mixtures thereof. It may be composed of tightly packed powder or of blocks formed as described above. Ducts 14 and 15 lead to opposite ends of a pipe coil 19 which is embedded in my heat storage material. Also embedded in the material is heating means 20 which may be an electric resistance heater or an electric strip heater or a plurality of such heaters. The terminals 21 of the heater are connected across a time switch 22 which may be so adjusted as to make possible the consumption of electric energy by the heater only during predetermined periods when "off peak" energy rates are available. Also included in the circuit supplying electrical energy to the heat storage material is thermostat 23. Fan or blower 24 operated by electric motor 25 is provided to circulate air from the space to be heated through louver 12 and duct 14 thence through duct 14a and coil 19 and returning through duct 15 and louver 13 into the space to be heated. Thermostats 26 and 27 are connected in the circuit supplying electrical energy to motor 25, so that this circuit can be closed by switch 28 as will be more fully described below. Switch 29 is the master switch for connecting and disconnecting the system.

Assuming that the system has been installed and that the heating season is at hand, switch 29 is closed. Thereafter, due to the operation of time switch 22, electrical energy will be available for heating the heat storage material during those periods when "off peak" electricity rates apply. Thermostat 23 is so adjusted that the energy supply is cut off when the temperature of the heat storing material is at a predetermined temperature, preferably about 50 to 75° above the transition point of the material and is restored when the temperature of the heat storage material drops to a predetermined point preferably 75 to 100° F. below the transition point of the heat storage material. There is thus provided a cycle for automatically storing heat by the use of off peak electrical energy, the amount of heat storing being not only the sensible heat but also the heat of transition of the heat storage material. The utilization of the stored heat is controlled by thermostats 26 and 27, the former being embedded in the heat storing material or optionally positioned in duct 15, the latter thermostat being positioned in the space to be heated. When the temperature at thermostat 27 falls below a predetermined level, say somewhere in the range of 60 to 70° F., it closes the circuit energizing motor 25, providing that the temperature at thermostat 26 is high enough to make possible the utilization of the stored heat. I prefer that thermostat 26 be set to break the circuit at a temperature of approximately 200° when it is embedded in the heat storage mass and approximately 100° when it is located in duct 15. However, the precise setting will depend on the size of the furnace, the volume of space to be heated, the capacity of blower 24 and other factors known in the space heating art.

It is well known that space heating thermostats such as thermostat 27 are customarily so set as to call for maintaining a higher temperature during the day than at night. On the contrary, off peak energy rates usually apply during the night, and particularly between the hours of 11:00 p. m. and 7:00 a. m. or thereabouts. It will be seen, therefore, that I have provided a system for storing heat during the off peak period and utilizing it during the peak heating period.

Fig. 4 shows another way in which my novel heat storage system may be utilized. The numerals in Fig. 4 which are common to Figs. 3 and 4 designate corresponding parts of the installation. In Fig. 4 the construction of the furnace is not shown in the same detail as was used in Fig. 3, but within the shell 16 in Fig. 4 is a generally similar structure comprising insulation, heat storage material and an air circulating coil arranged substantially as they are in Fig. 3. Further in Fig. 4, the numeral 30 designates the total electrical load on the mains which also supply energy to my system, said load being the normal variable household load such as lights, appliances, and the like. 31 designates a current responsive device and 32 a current limiting device, these devices being means known in the art and serving to insure that the energy consumed by my system plus any other energy consumed by load 30 at any given time is no greater than the safe working load on the mains.

In the operation of my system installed as shown in Fig. 4, thermostat 23, which is embedded in the dimorphic mass, is preferably preset so as to allow current to pass through heating unit 20 when the temperature of the mass is between approximately 75 to 100° below the transition temperature and 50 to 75° above the transition temperature of the dimorphic material. When switch 29 is closed, and the temperature of the mass is within the range for which thermostat 23 is set, a variable amount of electrical energy, depending on the number of appliances 30 in operation and the setting of the load limiting device 32, will flow through heating unit 20. Thus, if the maximum safe working load on the mains is 25 kilowatts and 10 kilowatts are being momentarily used by other appliances connected across the mains, a maximum of 15 kilowatts will be available to heat the dimorphic material. When none of the other appliances is in use, all 25 kilowatts will flow through the heater 20 until such time as the temperature of the dimorphic mass has been raised to the "off" setting of thermostat 23. Just as in the case of the system shown in Fig. 3, the stored heat is utilized by circulating air from the space to be heated through the coil embedded in the heat storing agent whenever the temperature adjacent thermostat 27 is below the "on" setting for this thermostat and the temperature adjacent thermostat 26 is above the "off" setting for this thermostat.

It will be noted that, by the combination of controls provided in Figs. 3 and 4, there may be times when energy will be supplied to the heating unit 20 simultaneously with the passage of air through coil 19. This in no way detracts from the efficiency or advantages of my system. Under certain circumstances, particularly when coil 19 is so designed as to make possible a high rate of heat transfer from the heat storage medium 18 to the fluid passing through the coil and when the heat storage medium is at or near the upper part of its operating temperature range, it may be that the temperature of the air entering duct 15 would be too high for admission to the space to be heated. To avoid such contingencies, my systems may be provided with a by-pass between ducts 14a and 15, such by-pass being provided with dampers, automatically set by a thermostat in or near the louver 13, in a manner known in the heating and ventilating art.

Fig. 5 shows one way in which my system can be installed and utilized in connection with a burner consuming liquid or gaseous fuel. In Fig. 5, 41 designates a heat insulating shell, which may be enclosed within a metal shell not shown. Within the heat insulating shell is a mass, 42, of anhydrous sodium sulfate or other dimorphic material in accordance with my invention, which material again may be built of blocks manufactured as hereinabove described or may be in compact powdered form. Fuel is supplied to burner 43 through pipe 44 in the usual manner. Hot products of combustion pass through one or more flues 45 embedded in the mass 42. Duct 46 conveys air through coil 47 embedded in the heat storing material, the heated air being led through duct 48 to the space to be heated. In Fig. 5 I have not shown the thermostats, louvers, blower, and other ancillary apparatus, but their location and manner of use will be clear to those skilled in the art especially in the light of the discussion of Figs. 3 and 4 above.

Figure 6:
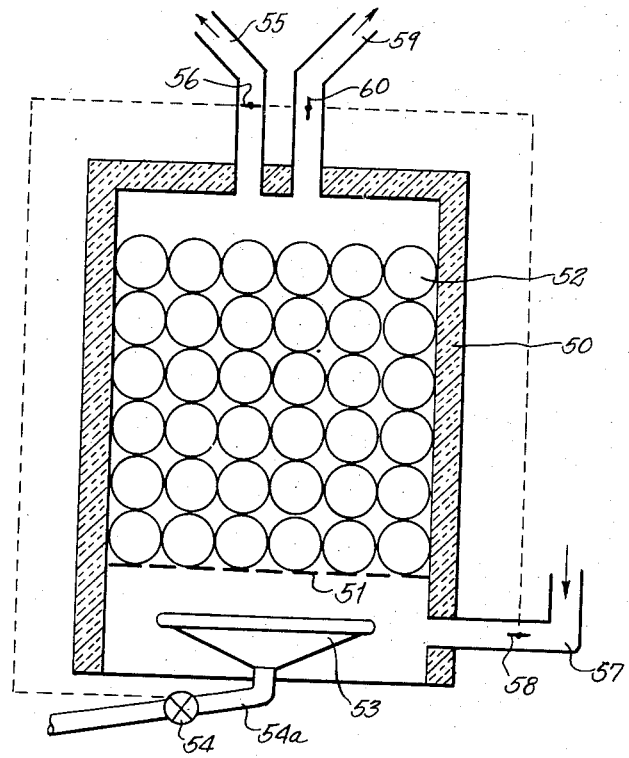
Fig. 6 shows still another embodiment of my system.

Fig. 6 shows another system embodying my invention, in which heat transfer to and from the mass of dimorphic material is by direct contact rather than indirect. In this figure, the numeral 50 designates the heat insulated shell comprising the furnace. On a perforated grate or grid 51 is supported a mass of individual blocks 52 of a dimorphic material hereinabove described. The blocks 52 may be cylinders or spheres of about 1 to 2 inches in diameter, or they may be formed and arranged like the checkerbrick in a conventional regenerative or recuperative furnace. In the space beneath the grate 51 is a gas or oil fuel burner 53 having a fuel supply valve 54 in fuel supply line 54a. Hot products of combustion, after passing through the mass of dimorphic material, leave the furnace line 55, which is equipped with damper 56. Line 57, equipped with damper 58, is provided for supplying air to be heated by the dimorphic material and said air, after passing through the mass, leaves the furnace through line or pipe 59, which is equipped with damper 60. Damper 56 is interconnected with valve 54 so that it is closed except when the burner 53 is supplying heat. Dampers 56 and 60 are interconnected so that 60 may be open only when 56 is closed, and dampers 60 and 58 are interconnected so that both are open or closed to the same extent at any time. In the device shown in Figure 6 heat is stored in the dimorphic material by heating it past its transition temperature by means of burner 53. During this time damper 56 is open and dampers 58 and 60 are closed. When the mass of dimorphic material has been heated to the desired temperature, preferably about 50 to 75° above its transition point, valve 54 and damper 56 are closed. This may be accomplished by a thermostat (not shown) in the mass of dimorphic material. Other thermostats, in the space to be heated, as shown for example in Figures 3 and 4, open dampers 58 and 60 and, by means of a blower (not shown) force air in direct contact with the mass of dimorphic material, thereby heating the air not only by the sensible heat of the dimorphic material but also by its heat of transition. It will, of course, be understood that the device shown in Figure 6 can be modified to include electric means for heating the dimorphic material while retaining the feature of direct heat exchange with the air to be heated. The device shown in Figure 6 can also be adapted to utilize any of the known control methods shown in Figures 3 and 4.

Figure 7:
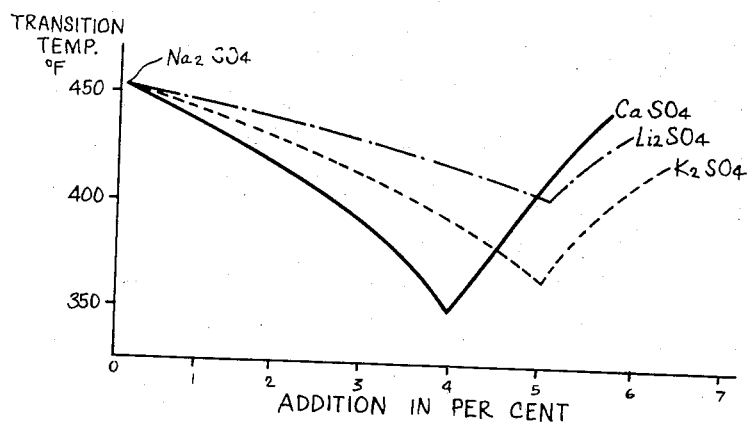
Fig. 7 shows the effect of the admixture of small amounts of other salts on the transition temperature of the anhydrous sodium sulfate.

As stated above, anhydrous sodium sulfate, with a transition temperature of 451° F., is a heat storing material suitable for most purposes in connection with my novel system. However, where local conditions make it advisable to use a heat storage material having lower transition temperature, the addition of small amounts of other salts to the anhydrous sodium sulfate provides a dimorphic material having such lower transition temperatures. Fig. 7 shows graphically the changes in the transition temperature of anhydrous sodium sulfate which I obtain by the admixture thereto of small amounts of calcium sulfate, potassium sulfate and lithium sulfate. It will be observed from the curves that the additions of up to approximately 5% of these substances to the sodium sulfate lowers the transition temperature to a minimum, which is different in the case of each of the substances referred to, but that further increases in the amounts of the admixed salts cause a rise in the transition temperature from these minima. The addition of calcium sulfate or potassium sulfate decreases the latent heat of transition of the mass to some extent. Lithium sulfate has about the same heat of transition as does sodium sulfate, but is much more expensive than the other materials which may be added to modify the transition temperature of sodium sulfate. On the other hand, the addition of salts such as sodium chloride, which do not themselves have a transition temperature, will also decrease the transition temperature of sodium sulfate. However, the addition of such salts has only a very slight effect on the temperature of transition and also greatly decreases the heat of transition of the mass and is, therefore, not desirable. It will be noted from the curves in Figure 7 that transition points between 450° F. and approximately 350° F. can be obtained by adding up to approximately 7% of the additive or modifying salts shown, but the maximum useful effect of the additives (i. e., decreasing the transition temperature to the desired point while decreasing the heat of transition as little as possible) is obtained by using them only in the amounts indicated by the descending branches of the curves. These additives are in no sense catalysts or crystallization promoters, but merely substances which I have found decrease the transition point of the anhydrous sodium sulfate. The phenomenon is somewhat analogous to the effect of an added substance in decreasing the melting point of a solid material. However, as already explained, fusion is not involved in the novel method of my invention, as heat in excess of the sensible heat of the dimorphic material used is available solely in the form of heat of transition from one crystalline form to another.

In place of sodium sulfate I can use other materials having a transition point from one crystal form to another. Included among these are:

| Material | Transition Temperature, °F. | Heat of Transition, B. t. u. per lb. |
| --- | --- | --- |
| Lithium sulfate, $Li_2SO_4$ | 1,067 | 110 |
| Potassium sulfate, $K_2SO_4$ | 1,070 | 25 |
| Potassium Chromate, $K_2CrO_4$ | 1,230 | 23 |
| Sodium Molybdate, $Na_2MoO_4$ | 820 | 128 |
| Sodium tungstate, $Na_2WO_4$ | 1,070 | 60 |
| Sodium sulfate, $Na_2SO_4$ | 451 | 128 |

While some of the above materials are more suitable than sodium sulfate in special situations where extremely high transition temperatures are desirable, I have found that for space heating the preferred material is, as stated above, anhydrous sodium sulfate, either by itself or admixed with small quantities of the diluents and heat conductive materials described.

The scope of my invention is set forth in the claims below, and is not to be limited by the specific systems shown in the drawings, which are merely illustrative of some of the embodiments in which my invention may be used.

This application is a division of my application Serial Number 283,667, filed April 22, 1952, now Patent No. 2,808,494, granted October 1, 1957, for Method and Apparatus for Storing and Releasing Heat.

I claim:

1. The method of storing and releasing heat comprising the steps of converting solid anhydrous sodium sulfate in a heat-insulated bed from the rhombic to the hexagonal crystal form by the application of heat and of passing a fluid medium in heat exchange relationship with said sodium sulfate while it undergoes transformation from the hexagonal to the rhombic crystal form.

2. The method of storing and releasing heat comprising the steps of heating a mixture of anhydrous sodium sulfate with a material selected from the group consisting of anhydrous calcium sulfate, anhydrous potassium sulfate and anhydrous lithium sulfate in a heat-insulated bed, thereby converting the anhydrous sodium sulfate in the solid state from the rhombic to the hexagonal crystal form and of passing a fluid medium in heat exchange relationship with said bed while the sodium sulfate therein is converted from its hexagonal to a rhombic crystal form.

3. In a method of heating a substance, the steps comprising supplying heat to a body of anhydrous dimorphic crystalline material at its transition temperature, thereby converting said material from a first solid anhydrous crystalline form to a second solid anhydrous crystalline form with the absorption and storage therein of the heat of conversion from said first to said second form, and the selective transfer of said absorbed heat of transition to said substance while said substance is in heat exchange relation with said body and is at a temperature substantially below said transition temperature to heat said substance with concomitant reconversion of said crystalline material from said second to said first anhydrous crystalline form.

4. A method according to claim 3 wherein at least about 90% of said anhydrous dimorphic crystalline material consists of anhydrous sodium sulfate and said heat is absorbed and stored therein by conversion from the rhombic to the hexagonal form.

5. A method according to claim 3 wherein at least 90% of said anhydrous dimorphic crystalline material consists of anhydrous sodium sulfate, wherein said body is heated to store heat therein by transfer of heat from a heating element in heat exchange with one portion of said body, wherein said stored heat is transferred to said substance while said substance is in heat exchange relation with another portion of said body and wherein loss of heat from said body except to said substance is minimized by heat insulation material disposed about said body.

6. The method of heating a substance which comprises the steps of applying heat from a heat source to one portion of a bed consisting of at least about 90% of solid anhydrous sodium sulfate at the temperature of its transition from the rhombic to the hexagonal form and simultaneously transmitting heat to a substance at a temperature below said transition temperature that is in heat exchange relation with another portion of said body, thereby heating said substance by heat supplied from said heat source by transmission through said body.

7. The method of storing and releasing heat which comprises the steps of applying heat to one portion of a bed consisting of at least about 90% of solid anhydrous sodium sulfate at the temperature of its transition from the rhombic to the hexagonal form and simultaneously directing fluid at a temperature below said transition temperature in heat exchange relation with another portion of said bed.

References Cited in the file of this patent

UNITED STATES PATENTS

| | | |
| --- | --- | --- |
| 1,054,409 | Harrison et al. | Feb. 25, 1913 |
| 1,894,775 | Levenson | Jan. 17, 1933 |

FOREIGN PATENTS

| | | |
| --- | --- | --- |
| 471,505 | Great Britain | Dec. 3, 1935 |